No. 869,807. PATENTED OCT. 29, 1907.
A. ROSENFELD.
VENDING APPARATUS.
APPLICATION FILED DEC. 1, 1906.
2 SHEETS—SHEET 1.
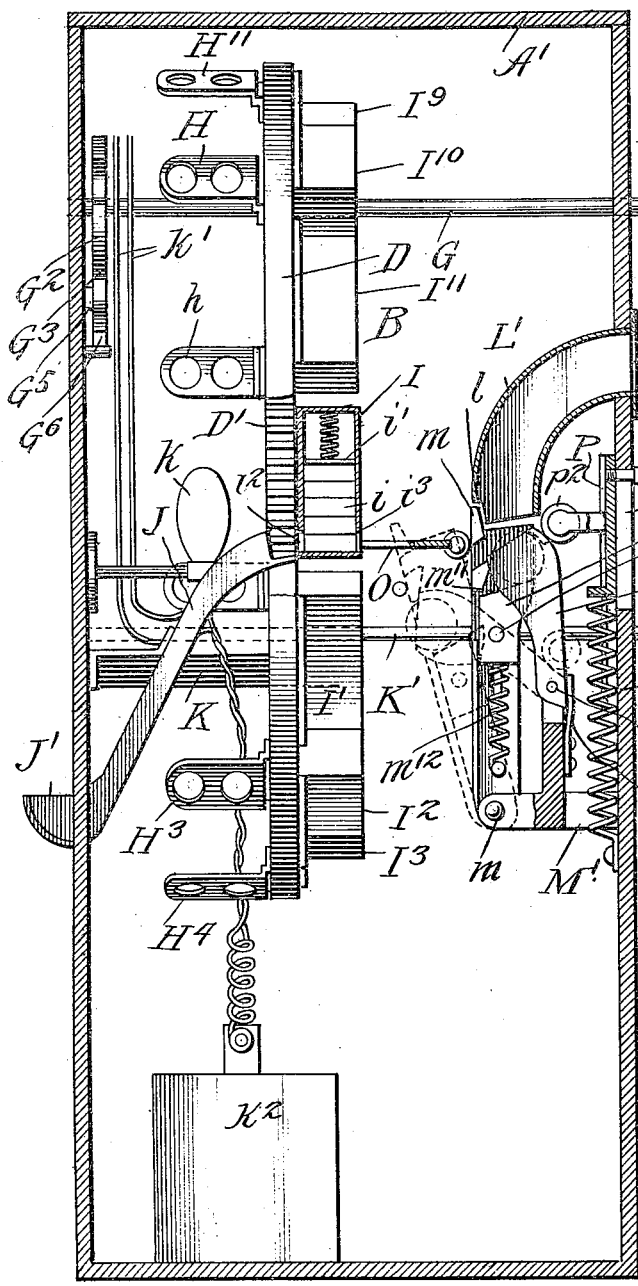
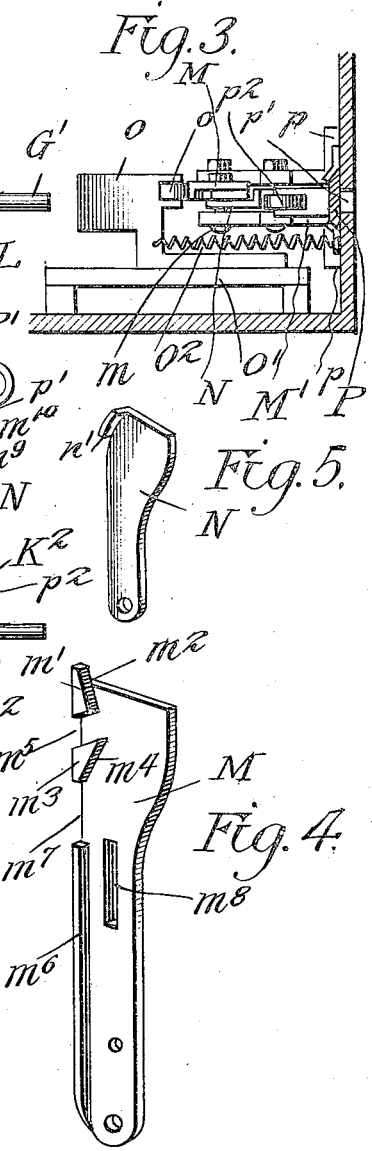
Witnesses
Inventor
Arnold Rosenfeld,
By Victor J. Evans
Attorney

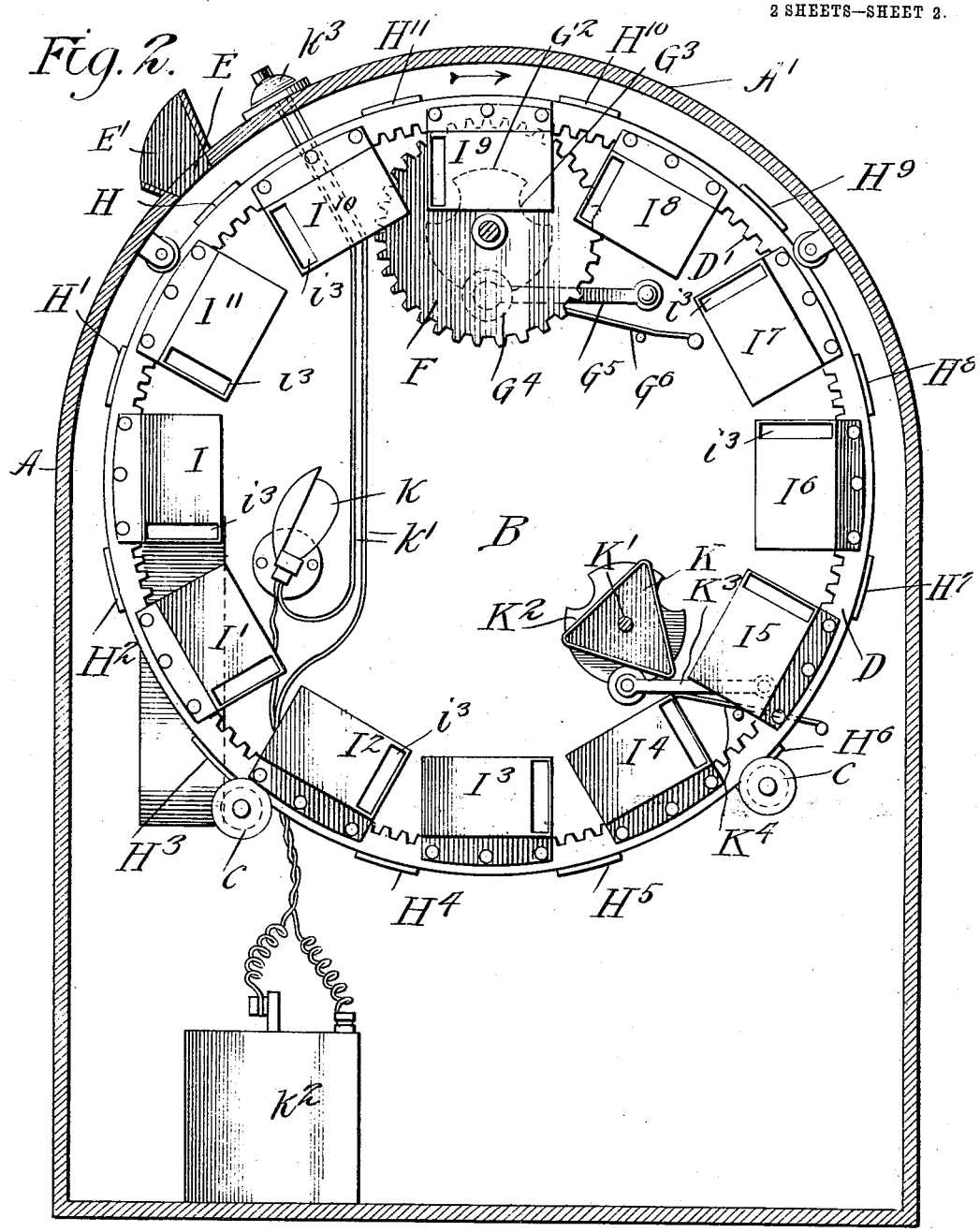

UNITED STATES PATENT OFFICE.

ARNOLD ROSENFELD, OF BEL AIR, MARYLAND.

VENDING APPARATUS.

No. 869,807.     Specification of Letters Patent.     Patented Oct. 29, 1907.

Application filed December 1, 1906. Serial No. 345,877.

*To all whom it may concern:*

Be it known that I, ARNOLD ROSENFELD, a citizen of the United States of America, residing at Bel Air, in the county of Harford and State of Maryland, have invented new and useful Improvements in Vending Apparatus, of which the following is a specification.

This invention relates to a combined eye testing or examining and coin-controlled eyeglass vending apparatus.

The main object of the invention is to provide an apparatus by which the intending purchaser of a pair of eyeglasses or spectacles may test his eyes before purchasing, and then, by the operation of suitable coin-controlled mechanism upon the insertion of a proper coin, obtain a pair of eyeglasses or spectacles of the nature required to suit the sight in accordance with the requirements shown by the test.

A further object is to provide a vending apparatus of the rotary type which is simple of construction, comparatively inexpensive of production, efficient in operation, and adapted to enable the purchaser to secure the prescribed character of glass in an easy manner upon following simple directions.

With the above and other objects in view, the invention consists of the novel construction, combination and arrangement of parts hereinafter fully described and claimed, reference being had to the accompanying drawings, in which:—

Figure 1 is a vertical transverse section, with a portion of the rotary carrier broken away to better show the construction, of a vending apparatus embodying my invention. Fig. 2 is a vertical front to rear section through the apparatus. Fig. 3 is a horizontal section through the casing looking down upon the parts of the coin-controlled discharge mechanism. Figs. 4 and 5 are detail views of the swinging frame and actuating lever of the discharge mechanism.

Referring to the drawings, the letter A designates a suitable inclosing casing, preferably provided with an upper curved or dome-shaped top A', the said casing being made light tight in any suitable manner to form a darkened chamber B, in which the parts of the vending mechanism are inclosed.

Mounted to turn upon properly arranged supporting pulleys C within the chamber B is a rotary wheel or carrier D, the periphery of which is arranged to be viewed from the exterior through observation openings E (one or more) formed in the upper front portion of the curved top A', upon which latter is disposed an eye shield E' adapted to inclose that portion of the face around the eyes of the person gazing through said openings to exclude exterior light rays. The wheel or carrier D comprises a ring or annulus provided with internal gear teeth D' which mesh with the teeth of an operating gear F mounted upon a shaft G extending transversely of and journaled in the side walls of the casing and having one of its ends extending exteriorly thereof and provided with a crank handle G', by which said gear may be turned to rotate the carrier. On the shaft G is fixed a disk $G^2$ provided with peripheral teeth or recesses $G^3$ adapted to receive a roller $G^4$ upon the free end of a pivoted pawl $G^5$, normally pressed into locking engagement with the disk by a spring $G^6$. The teeth or notches in the disk are arranged to be engaged by the locking pawl upon the movement of the rotary carrier a sufficient distance to bring any certain testing lens and associated hopper or holder containing the glasses represented thereby, as hereinafter described, into respective alinement with the observation openings and the discharge chute and ejecting device of the coin-controlled vending mechanism. The pressure of the pawl is sufficient to hold the rotary carrier from movement, the formation of the notches and roller, however, being such as to permit the drum to be turned in either direction by the expenditure of a slight degree of force on the crank handle G', the roller running between the notches as the disk turns on the periphery of said disk, as will be readily understood.

Arranged equidistantly around the periphery of the rotary carrier and extending laterally one side thereof so as to successively come beneath the observation openings E as the carrier is turned is a series of brackets H, H', etc., each carrying a pair of lenses $h$, of proper form and size to register accurately with the openings E. These lenses are employed to test the eyes of the prospective purchaser, and the lenses of the several sets or pairs vary in strength and other characteristics to overcome different visual defects. Also arranged equidistantly in spaced relation around the rotary carrier is a series of hoppers, holders or goods-containing chambers I, I', etc., hung upon the inner side of the carrier and projecting laterally on the opposite side from the lenses, each of said holders comprising a box of the prescribed dimensions to receive a column of boxes or packages $i$, each containing a single pair of eyeglasses or spectacles. The column of packages is normally pressed toward one end of the holder by a spring-actuated follower $i'$, the bottom package being designed to be discharged by the ejecting device of the coin-controlled discharge mechanism. To this end the holder is formed in its opposite sides with openings $i^2$ and $i^3$ forming an outlet for the discharge of the package and an inlet for the reception of the ejecting device by which it is discharged. The discharge opening of each holder is adapted to register when the holder comes into discharging position with the upper end of a discharge chute J leading to a receiving cup or trough J' located exteriorly upon one of the sides of the machine, and to which the package passes by gravity through the chute. Assuming that the glasses within the holder I are of the same strength or character as the lenses carried by the bracket H, it will be observed that when such lenses are in alinement with the observation openings E, the holder I will be in discharging position. The lens-carriers and holders are coöperatively arranged in this manner around the rotary goods-carrier, so that at all times in the operation of the machine the holder carrying the eyeglasses or spectacles represented by any particular set of testing lenses will be in position for the discharge of a package therefrom while the lenses are in alinement with the observation openings E.

Disposed within the chamber B at a proper distance from the openings E is a sight object comprising a drum K of polygonal form, which is mounted upon a shaft K′ adapted to be turned from the exterior by a crank handle K². In the present instance I have shown a drum of triangular form, the opposite faces of which are designed to bear suitable printed test matter or carry cards embodying such matter.
This matter may be printed in different languages upon the different faces or cards, and the drum is revolubly mounted in order to permit either card to be brought to view through the observation openings and the lenses, whereby, after looking through all of the lenses and inspecting the different sets of test matter on the faces of the drum the operator or intending purchaser can readily determine which of the several sets of lenses best suits his eye and can then actuate the discharge mechanism to secure the desired pair of eyeglasses or spectacles. The chamber B is adapted to be lighted up by an incandescent lamp $k$ suitably supported therein and arranged in a circuit $k'$, in which is a battery or other source of current $k^2$ and a switch button or other circuit-closing device $k^3$, the latter arranged to be operated from without by the person gazing through the sight openings E. The lamp projects its rays upon the exposed test card or face of the drum K, thus bringing the same strongly into view. Upon closing the electric circuit, the lamp will glow, and the operator by then turning the crank handle K² may rotate the carrier to successively bring the lenses thereon into register with the sight openings E, so that he may look therethrough at the sight object or test card. Upon reaching a satisfactory conclusion as to which set of lenses best suits his eyes, the person desiring glasses then deposits a coin of the prescribed denomination and effects the discharge of the glasses from the proper holder through the medium of the coin-controlled discharge mechanism, which I will now proceed to describe. A notched disk K², similar to disk G², is fixed on shaft K and engaged by a pawl K³, similar to pawl G⁵, actuated by a pressure spring K⁴, whereby the drum may be releasably locked with either of its faces in operative position.

In the side of the casing corresponding to the side of the wheel on which the holders are mounted, a coin inlet or insertion slot L is provided and communicates with a coin chute L′ leading downwardly into the casing therefrom. Below the lower end of the chute is arranged a swinging frame M, comprising a plate pivoted at its lower end, as shown at $m$, to a stationary bracket M′ to swing in a direction toward and from the adjacent side of the rotary carrier. The frame or plate M is formed at its inner upper edge with an operating lug $m'$ having an inclined outer face $m^2$, and below said lug with a second lug $m^3$ having an inwardly and downwardly inclined face $m^4$, said lugs being spaced to provide an intervening passage $m^5$. A flange $m^6$ extends laterally from the inner edge of the frame or plate below the lug $m^3$ and is spaced therefrom to provide a passage $m^7$. The lug $m'$ is adapted to be received in a notched portion $l$ at the lower end of the chute L′ and abuts against said chute to limit the outward or return movement of the frame or plate, the inclined face of the lug also serving to guide the entering coin to the pocket or receiving space formed between the parts of the plate and the actuating lever, hereinafter described. In the plate M is formed a vertical slot $m^8$, in which plays a guide pin or projection $m^9$ upon a sliding coin-supporting plate $m^{10}$, which plate is formed at its upper edge with an inwardly and downwardly inclined face $m^{11}$, upon which the coin rests prior to the actuation of the discharge mechanism. A spring $m^{12}$ supports the plate $m^{10}$ in normal operative position and permits depression thereof for the discharge of the coin in the manner hereinafter set forth. The swinging frame or plate is designed to be operated by a lever N, consisting of a plate pivoted at its lower end to the bracket M′, as at $n$, and formed at its upper rear or outer edge with a finger $n'$ to engage the coin, which latter couples or forms a connection between the lever and swinging frame whereby forward motion to the latter may be imparted. A spring $n^2$ is suitably arranged to resist forward or inward movement of the lever N and to return the same to normal position.

The lug $m'$ is arranged to bear against a friction roller $o$ mounted upon the outer or rear portion of an ejector O, suitably mounted to slide in a guide bracket O′ and suitably formed at its inner edge for movement in the opening $i^3$ of each goods-holder to act as a plunger for discharging the lowest package through the opening $i^2$ of said holder into the goods discharge chute J. A spring O² connects the ejector with some suitable portion of the casing and serves to return said ejector and the swinging frame or plate M to normal position after actuation thereof. An operating device in the form of a plate P is mounted to slide in guides $p$ and is provided with an operating knob or finger piece P′ projecting to the exterior of the casing through a slot $p'$, in which it is vertically movable to permit the plate P to slide vertically in the guides, said plate being normally held at the limit of its upward movement by a spring P². A roller or contact member $p^2$ is carried by the operating slide P and bears and rides upon the outer curved edge of the lever N, which curved edge forms a cam surface, whereby forward swinging motion is imparted to said lever when the operating plate is depressed.

The coin inserted into the machine drops vertically from the chute L′ on to the upper inclined edge of the supporting plate $m^{10}$ between the upper end portions of the swinging frame and actuating lever and the lug $m^2$ and finger $n'$, which portions form a coin-receiving pocket. When the coin is thus inserted the operator depresses the operating slide P, and the roller $p^2$ is thereby caused to impart a forward swinging motion to said lever. As a result, the finger $n'$ transfers motion through the coin to the swinging frame which slides the ejector O inward, thereby discharging the bottom package from the holder arranged in operative alinement therewith. As the lever and swinging frame move inwardly on the different arcs on which they swing, the pressure of the finger $n'$ causes the coin to depress the supporting plate $m^{10}$ and to ride in contact with the inclined surfaces of said plate and the lug $m^2$, until, when the parts described reach the limit of their swinging movement, the supporting plate will be depressed sufficiently to expose the passage $m^7$ normally closed thereby, through which passage the coin passes and drops downward into the casing. When the operating device is released, the springs then return the parts to normal position ready for the succeeding operation. If any attempt should be made to operate the device for the discharge of a package without the prior insertion of a proper coin, such attempt would be defeated, as on the swinging movement of the lever N the finger $n'$ will simply swing freely through the passage $m^5$, thus preventing motion from being transmitted to the said swinging frame or plate M.

It will be observed that by the arrangement of the lenses upon one side of the rotary carrier for coaction with the sight object on the adjacent side of the chamber and the arrangement of the holders or receptacles upon the opposite side of the carrier for coaction with the ejecting mechanism on the same side of the chamber provision is made for the transverse movement of the ejecting device through the holders on the carrier for the discharge of the glasses therefrom into the outlet chute J, which, by the arrangement described, may also be so placed as to lie inwardly of the circular plane of movement of the lenses, whereby all liability of interference between the parts is prevented and compactness of construction and arrangement secured. It will also be observed that the relative arrangement of the lenses and holders is such as to enable the prospective purchaser, upon the conclusion of the test, to deposit a coin and secure a pair of the required glasses without the necessity of further adjusting or manipulating the machine in any particular to bring the holder carrying the desired glasses into discharging position.

From the foregoing description, taken in connection with the accompanying drawings, the construction and mode of operation of the invention will be readily understood, and it will be seen that it provides a simple, effective and reliable apparatus by which a person desiring to purchase a pair of eyeglasses or spectacles may test his eyes before purchasing to determine the kind or character of glasses required to suit his defect of vision, and then, upon the insertion of a proper coin, may obtain a pair of eyeglasses or spectacles of the required nature. The invention is primarily designed to enable persons unable to pay occulist fees and buy high grade glasses to procure glasses suitable for overcoming visual defects for assistance in reading or sewing or similar occupations, and to make tests to determine the kind of glasses required to suit the individual case without additional cost.

Having thus described the invention, what is claimed as new, is:—

1. A testing and vending apparatus of the character described comprising a casing providing a darkened chamber and having sight openings and an outlet, means for illuminating the chamber, a rotary carrier within the chamber, testing lenses upon the carrier adapted to be brought into registering relation with the sight openings, a sight object disposed in line with the sight openings and within the plane of rotation of the lenses, means for rotating the carrier, holders arranged upon the carrier in such relation to the lenses that when any particular set of lenses is in register with the sight openings the holder carrying the glasses represented thereby will be in position for the discharge of the glasses therefrom through the outlet, and means for ejecting the glasses from the holders.

2. A testing and vending apparatus of the character described, comprising a casing providing a darkened chamber and having sight openings and an outlet, means for illuminating the chamber, an ejecting device arranged for movement toward and from the outlet, a rotary carrier within the casing movable in a path between said outlet and ejecting device and provided upon its periphery with lenses disposed in spaced relation and adapted to register with the sight opening, means for rotating the carrier, a sight object disposed in the chamber in the space bounded by the path of rotation of the lenses, holders upon the carrier arranged in spaced relation on lines between the lenses and in such relation thereto that when any particular set of lenses is in register with the sight openings the holder carrying the glasses represented thereby will be in position for the discharge of the glasses therefrom through the outlet, said holders being provided with transverse passages for the movement of the ejector therethrough, and means for operating the ejector.

3. A testing and vending apparatus of the character described comprising a casing providing a darkened chamber, said casing having sight openings and an outlet, an ejector movable toward and from said outlet, means for illuminating the casing, a rotary carrier arranged within the casing and movable in a path in line with the sight openings and between the outlet and ejector, means for rotating the carrier, testing lenses arranged in spaced relation upon the periphery of the carrier, a sight object arranged within the space bounded by the path of rotation of the lenses and in position to be viewed through the sight openings and the lenses in register therewith, holders fixed upon the periphery of the carrier and projecting inwardly therefrom, said holders being provided with transverse openings for the discharge of glasses therefrom by the ejector through the outlet and so arranged relative to the lenses that when any particular set of lenses is in register with the sight openings the holder carrying the glasses represented thereby will be in discharging position, and means for operating the ejector.

4. A testing and vending apparatus of the character described comprising a casing providing a darkened chamber, said casing being provided at its front with sight openings and at one side with an outlet and a discharge chute leading thereto, means for illuminating the casing, a rotary carrier arranged within the casing, an annular series of sets of testing lenses projecting laterally from the carrier on the side adjacent the discharge chute, a sight object disposed within the space bounded by the path of rotation of the lenses and arranged to lie in line with the sight openings and any set of lenses registering therewith, holders arranged upon the opposite side of the carrier from the lenses and provided with transverse discharge openings, said holders being so disposed with relation to the lenses that when any particular set of lenses is in register with the sight openings the holder carrying the glasses represented thereby will be in discharging position, an ejector supported within the casing for movement transversely of the carrier and through the openings in the respective holders, and means for operating said ejector when any of said holders is in discharging position.

In testimony whereof, I affix my signature in presence of two witnesses.

ARNOLD ROSENFELD.

Witnesses:
H. E. HOBLITZELL,
WILLIAM A. WARNER.